US007646258B2

(12) United States Patent
Karr

(10) Patent No.: US 7,646,258 B2
(45) Date of Patent: Jan. 12, 2010

(54) DIGITAL FM TRANSMITTER WITH VARIABLE FREQUENCY COMPLEX DIGITAL IF

(76) Inventor: Lawrence J. Karr, 445 15th St., Santa Monica, CA (US) 90402

( * ) Notice: Subject to any disclaimer, the term of this patent is extended or adjusted under 35 U.S.C. 154(b) by 76 days.

(21) Appl. No.: 12/146,275

(22) Filed: Jun. 25, 2008

(65) Prior Publication Data

US 2009/0002089 A1    Jan. 1, 2009

Related U.S. Application Data

(60) Provisional application No. 60/946,373, filed on Jun. 26, 2007.

(51) Int. Cl.
*H03C 3/00* (2006.01)
*H04B 1/04* (2006.01)

(52) U.S. Cl. .......................... 332/117; 455/42; 455/45

(58) Field of Classification Search ................ 332/117; 455/42–45, 110–113, 422.1, 550.1
See application file for complete search history.

(56) References Cited

U.S. PATENT DOCUMENTS

| 5,272,454 | A | 12/1993 | Ikai et al. | 332/117 |
|---|---|---|---|---|
| 5,399,998 | A | 3/1995 | Hino | 332/127 |
| 6,272,465 | B1 * | 8/2001 | Hewitt et al. | 704/258 |
| 6,295,362 | B1 | 9/2001 | Zhang | 381/2 |
| 7,224,302 | B2 | 5/2007 | Dornbusch | 341/143 |

* cited by examiner

*Primary Examiner*—David Mis
(74) *Attorney, Agent, or Firm*—Gifford, Krass, Sprinkle, Anderson & Citkowski, P.C.

(57) ABSTRACT

A system, method and apparatus are described for digitally synthesizing a signal for FM transmission. A complex variable frequency digital IF signal is generated for use by a digital modulator in transmission of a signal with an integrated circuit. In some examples, the integrated circuit includes various baseband processing blocks, an up-sampler, a summer, a numerically controlled oscillator (NCO) and a complex rotator, all arranged in cooperation with one another. The complex variable frequency digital IF signal can be used by a digital quadrature modulator for generation of the synthesized analog RF transmission signal, and optionally for use with an orthogonal frequency division multiplexing (OFDM) scheme.

20 Claims, 8 Drawing Sheets

__US 7,646,258 B2__

DIGITAL FM TRANSMITTER WITH VARIABLE FREQUENCY COMPLEX DIGITAL IF

CROSS-REFERENCE TO RELATED APPLICATION

This utility patent application claims the benefit under 35 U.S.C. §119(e) of U.S. Provisional Patent Application No. 60/946,373, which was filed on Jun. 26, 2007.

FIELD OF THE INVENTION

The present disclosure relates generally to a system, method and apparatus for digitally synthesizing a signal for FM transmission. More particularly, a complex variable frequency digital IF signal is generated for use by a digital modulator in transmission of a signal with an integrated circuit.

BACKGROUND OF THE INVENTION

Direct digital frequency synthesis (DDFS) is a technique that is useful in systems to generate programmable frequency sinusoidal signals. In a DDFS system, a digital signal represents the desired output frequency as a number of sample points that are located along the curve of a sinusoidal waveform or sine wave. Each sample point is located at an instant of time associated with the sine wave. The rate at which the values cycle for the DDFS output determines the frequency of the signal.

A variety of DDFS techniques are describes in various U.S. Patents including U.S. Pat. No. 5,272,454 to Ikai et. al., U.S. Pat. No. 5,399,998 to Hino, U.S. Pat. No. 6,295,362 to Zhang, and U.S. Pat. No. 7,224,302 to Dornbusch.

In U.S. Pat. No. 5,272,454 a digital FM modulator is described that uses an analog-to-digital converter (ADC) to convert an input audio signal to a digital signal that is then gain scaled with a multiplier. Since the output of their multiplier results in a change in the desired center frequency, an adder is used in conjunction with a read-only memory (ROM) to correct for changes in the center frequency of the carrier. A direct digital synthesizer (DDS) is then used to integrate the corrected signal with a sampling period provided by a reference oscillator signal.

In U.S. Pat. No. 5,399,998 an ADC is again used in a digital FM modulator to convert an audio signal into a digital representation. The digital representation is combined with a center frequency by an adder, and passed to a DDS that again integrates the signal with a sampling period provided by a reference oscillator signal. A counter circuit measures the average frequency of the FM wave from the output of the DDS, which is then processed by an "operation means" to adjust the resultant center frequency for a desired center frequency.

In U.S. Pat. No. 6,295,362 a signal generator includes a digital signal processor (DSP) that processes left and right signal channels and interpolates the signals to create a composite baseband signal. The composite baseband signal is used by a numerically controlled oscillator to create an FM modulated carrier.

In U.S. Pat. No. 7,224,302 a modulator includes an ADC that generates digital signals in response to a stereo input signal, an integrator that processes the digital signals, and a DDFS generates a modulated output signal in response to the integrated digital signals.

A DDFS can be advantageously used in a radio frequency (RF) application. In accordance with Nyquist's theorem, the DDFS must be clocked at a rate at least twice as high as the frequency of the signal represented. Since the DDFS provides a digital representation of the output clock signal, rather than the output clock signal itself, there is no mechanism for local oscillator signals to leak or radiate into other circuits, causing unwanted locking or spurs.

The present disclosure has reviewed the above and other conventional DDFS systems in contemplation of the presently described invention. Various improvements are realized over the conventional DDFS systems as will be described.

DETAILED DESCRIPTION

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal, electromagnetic wave signal, or data signal. The meaning of "a", "an", and "the" include plural references. The meaning of "in" includes "in" and "on".

Briefly stated, the present disclosure generally relates to an integrated circuit for digitally synthesizing a signal for FM transmission. A complex variable frequency digital IF signal is generated by various baseband processing blocks, an up-sampler, a summer, a numerically controlled oscillator (NCO) and a complex rotator, all arranged in cooperation with one another. The complex variable frequency digital IF signal can be used by a digital quadrature modulator for generation of the synthesized analog RF transmission signal, and optionally for use with an orthogonal frequency division multiplexing (OFDM) scheme.

Figure 1:
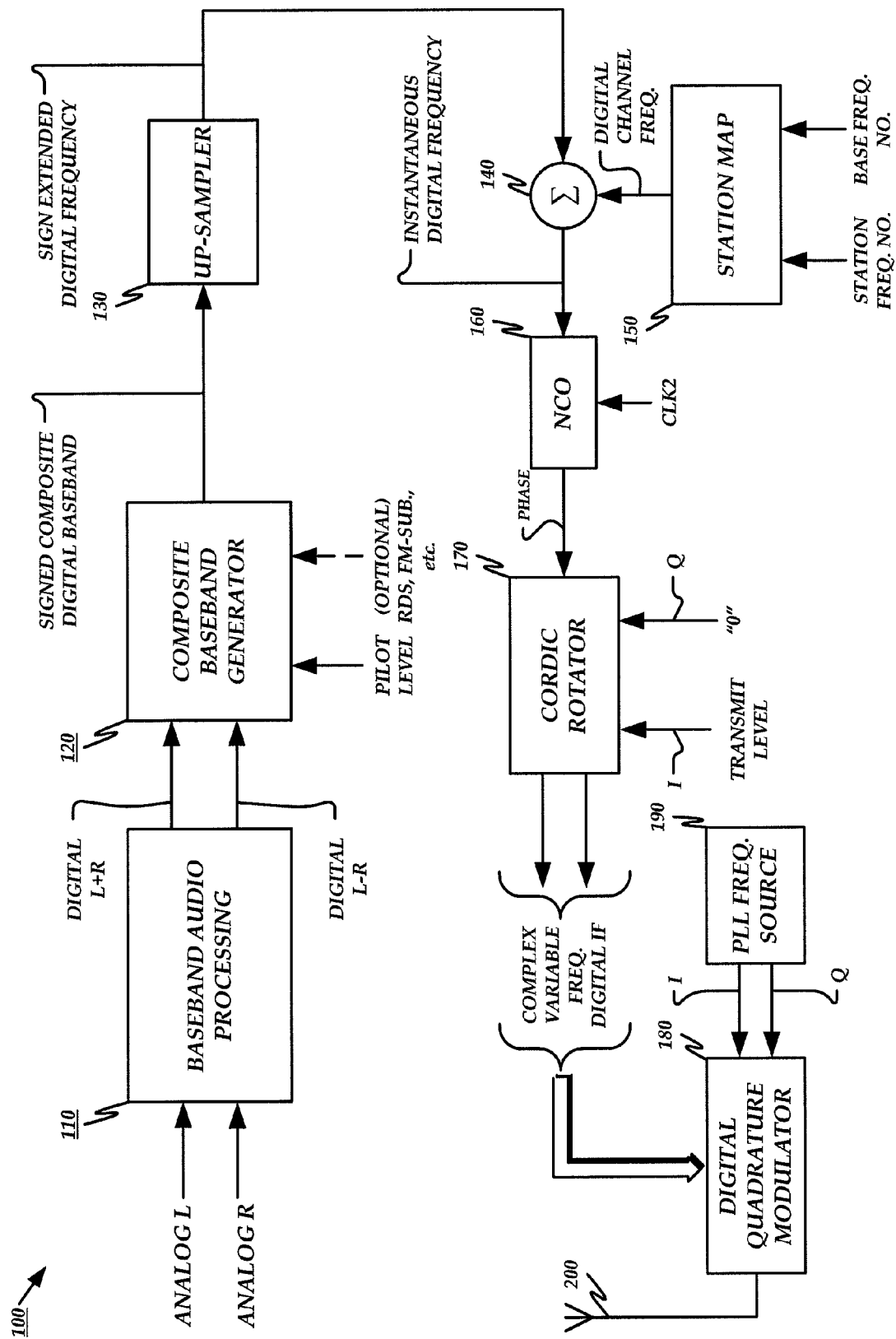
FIG. 1 shows the overall signal flow of some example FM transmitters.

FIG. 1 shows the overall signal flow of the FM transmitter. Left and right analog audio signals are baseband processed in baseband processor 110 to produce L+R and L−R interpolated band limited pre-emphasized digital signals. These signals are converted to a composite digital baseband, in 120, the composite baseband generator. The other inputs to 120 are a pilot level, expressed as a numerical constant, and perhaps an RDS or other FM sub-carrier signal. The composite digital baseband is then input to interpolators 130, which increase the sample rate of the composite digital baseband signal to the megahertz region. The output of the interpolators is sign extended and summed in a summer 140 with the output of a station map generator 150, resulting in a digital level-translated composite signal. This level-translated composite signal is the input to a numerically controlled oscillator 160, which generates a phase output at a sample rate of perhaps 49.152 MHz. This phase signal is an input to a high speed intermediate frequency cordic rotator 170, which also has an RF level control input. The output of the high speed intermediate frequency cordic rotator is a complex valued variable frequency digital IF signal. This complex valued variable frequency digital IF signal is in turn an input to a digital quadrature modulator 180 typically operating at a fixed frequency, which could be 98.304 MHz in our example. The digital quadrature modulator is supplied signal from a phase locked loop frequency source 190 whose on-chip voltage controlled oscillator (VCO) might operate at 128 times 12.288 MHz, or 1572.864 MHz. Finally, the output of the digital quadrature modulator may be coupled either to an antenna 200 or to the input of an FM receiver. An additional RF pass-band filter may be added to minimize spurious out of band emissions. This filter would be placed between the output of the quadrature modulator and either the antenna or other RF output.

Some example implementations of the RF transmitter may be arranged for operation with a tuned FM center frequency that is in a range from approximately 88.1 MHz to 107.9 MHz, with frequency steps of about 200 kHz for each station, as is expected for U.S. based FM transmitters. However, other example tuned FM center frequencies are also contemplated for other countries. For example, in Japan the tuned FM center frequency is in the range from about 76 MHz to about 90 MHz. Moreover, other frequency steps are also contemplated such as frequency steps of about 100 kHz for each station as may be required in some countries.

In one example RF transmitter, the center frequency has a base frequency that is desired to be set at 88.1 MHz. For this example, the numerically controlled oscillator (NCO 160) sets a sampling rate of approximately 49.152 MHz or 4*12.288 Mhz. The station map (150) for this example will generate a numerical quantity that corresponds to a complex digital channel frequency, which for an 88.1 MHz frequency and 28 bits of resolution could be −10.204 MHz. For a 28 bit resolution, the maximum value corresponds to $2^{28}$ or 268,435,456. Channel base frequency number for this example is given as follows: Base Freq. No.=−10.204 MHz*$2^{28}$/49.152 MHz=−55,727,445. For a channel step size of 100 kHz, the channel step=100 kHz*$2^{28}$/49.152 MHz=+546,133. Thus, in order to set the center frequency to another channel, each channel is offset relative to the base is added by the station map (150). For a center frequency of 97.7 MHz, for example, there is a 9.6 MHz increment relative to the base frequency of 88.1 MHz, with gives a step of 96*546,133 or 52,428,800 as the digital channel frequency.

Figure 2A:
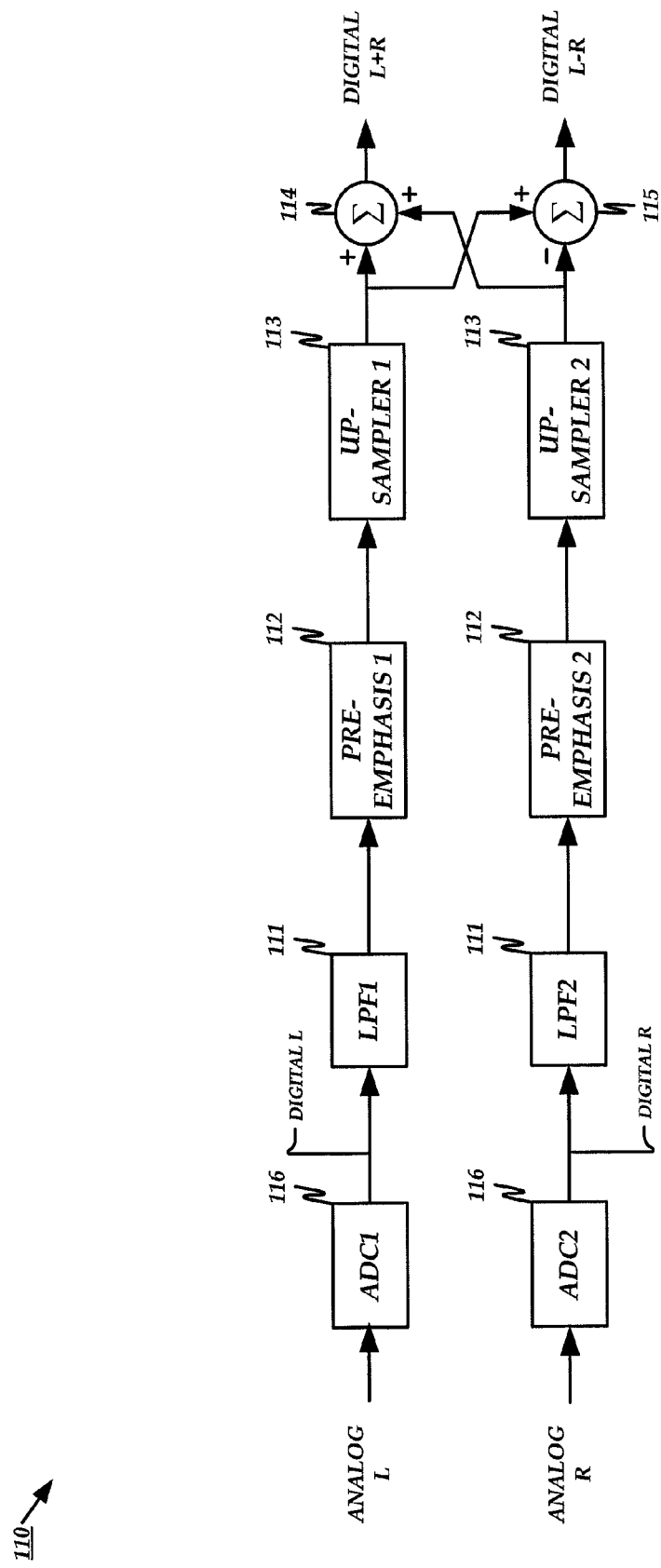
FIGS. 2A and 2B illustrate example baseband audio processing systems for some example FM transmitters.
Figure 2B:
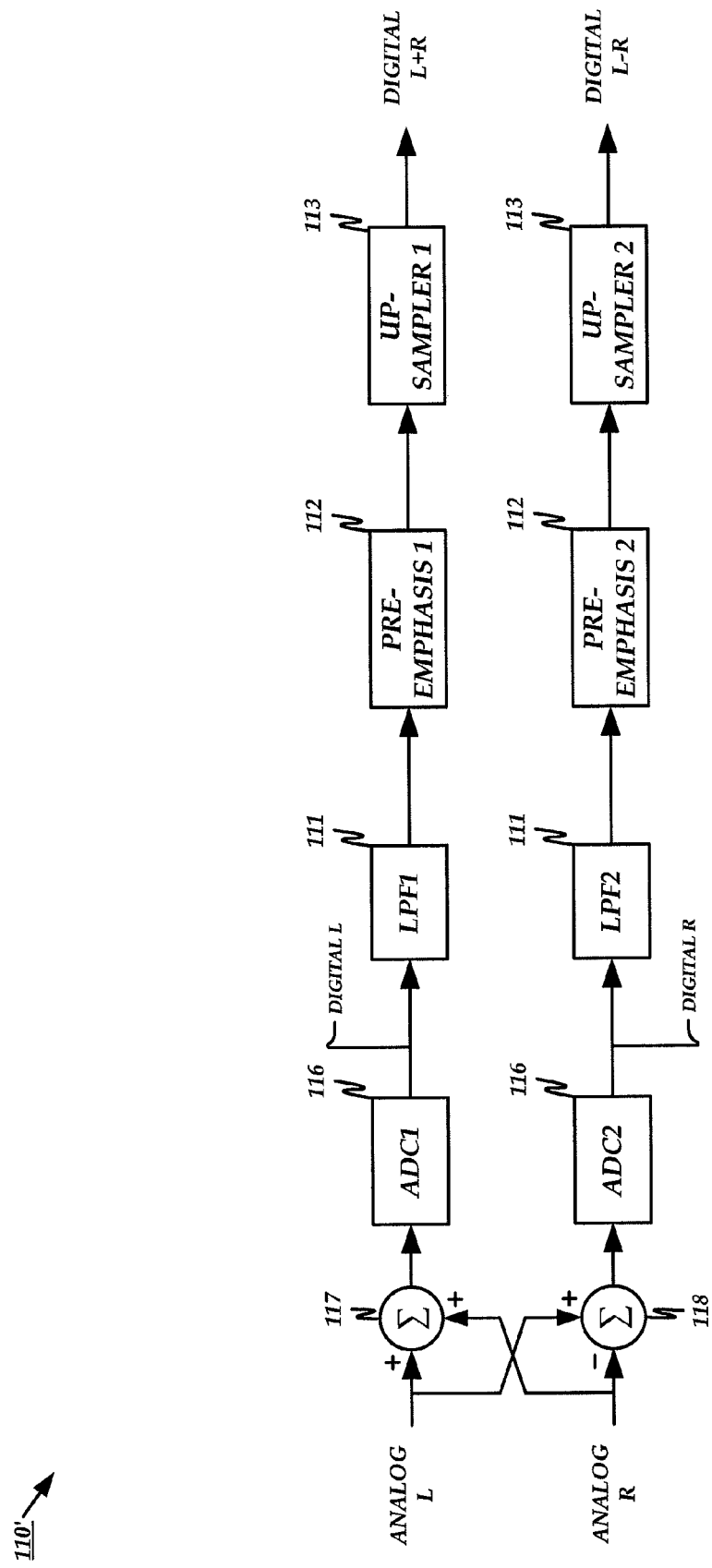

FIG. 2A shows the processing of the Left and Right Audio signals. In one version labeled 110, Left and Right audio signals are sampled and digitized in analog to digital converters 116 at typically 48 KHz. The sampled and digitized signals are band limited in a pair of digital low pass filters 111, so that frequencies above 15 KHz are attenuated. Subsequently, these band limited signals are passed through pre-emphasis filters 112, which cause a relative increase in higher frequency components. The pre-emphasized signals are then up-sampled and interpolated in interpolators 113 to perhaps 384K samples per second, and then added 114 and subtracted 115 to produce L+R and L−R band limited, pre-emphasized interpolated digital signals.

In an alternate version, 110', the L+R and L−R combination is performed in the analog domain 117 and 118, prior to digitization, the other steps being the same but omitting the final digital addition and subtraction 114 and 115. Alternatively, the addition and subtraction of the left and right signals can be digitally performed at places intermediate in the signal processing chain between the paths shown in 110 and 110'. In some other cases, the audio signals may be submitted to the transmitter in digital form, in which case the analog to digital conversion steps may be omitted.

Figure 3:
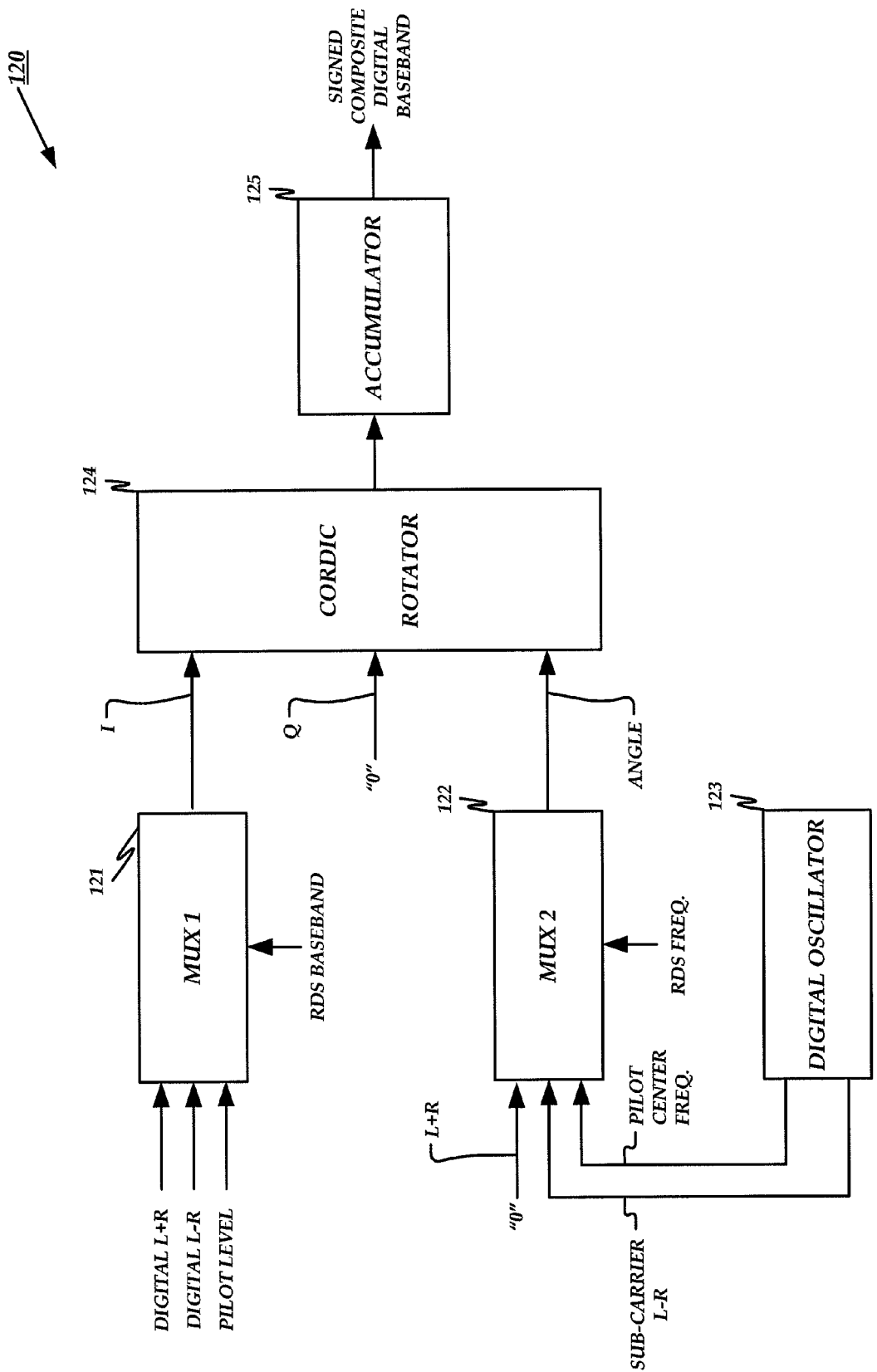
FIG. 3 illustrates an example composite baseband generator for some example FM transmitters.
Figure 4A:
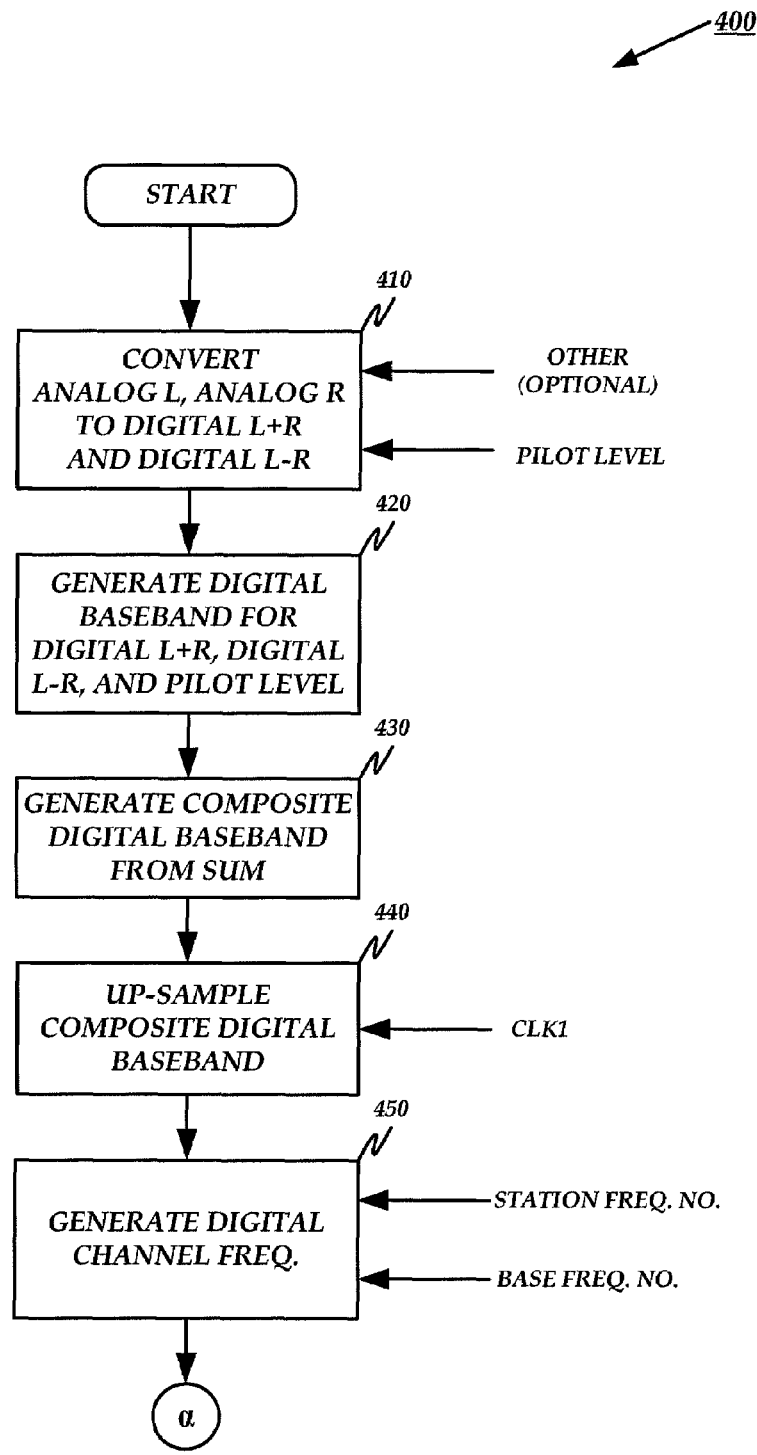
FIGS. 4A and 4B illustrate an example process flow for some example FM transmitters.
Figure 4B:
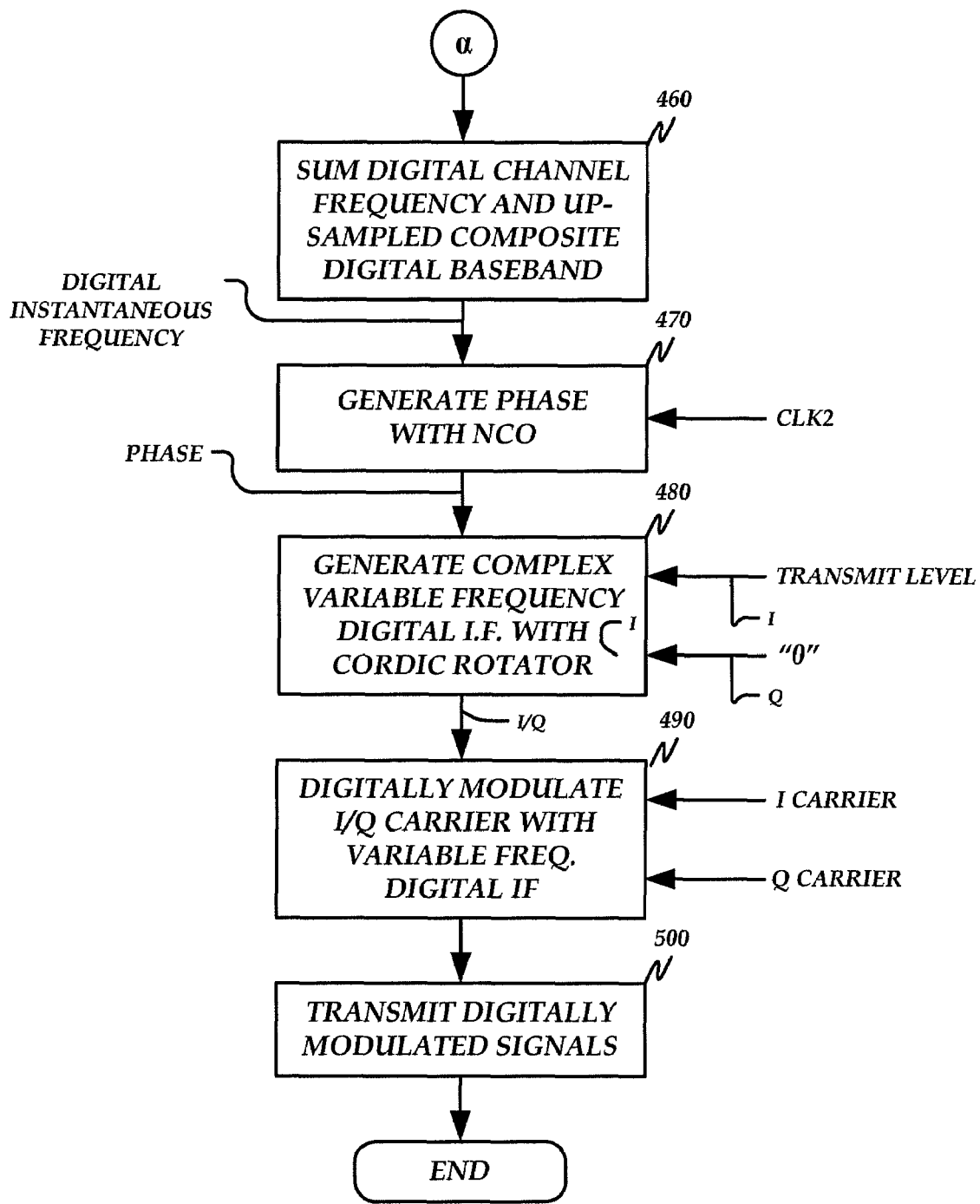

FIG. 3 shows the composite baseband generator. The inputs to this block are the digital L+R and L−R signals, the numerical pilot level, and a clock signal, which might be inputs of a cordic rotator 124. The cordic rotator processes in order three signals. These are the digital L+R, digital L−R and the digital stereo pilot level. Thus, in the first position of the multiplexer pair, the L+R digital signal is presented to the I input of the rotator, and a fixed phase, preferably zero is presented to the angle input. In the second multiplexer position, the L−R digital signal is presented to the I input of the rotator, and a digital representation from digital oscillator 123 of a 38 kHZ wave is coupled to the angle input. In this way, the L−R signal is heterodyned by 38 KHz, and the L+R signal will undergo the same amplitude transformation, thus maintaining correct amplitudes for the stereo components. In the third position, a number representing pilot tone amplitude is coupled to the I input of the rotator, and 19 KHz from digital oscillator 123 is coupled to the angle input of the rotator. In general the Q input to the rotator is coupled to zero. Finally, the successive terms generated by the cordic rotator are summed in accumulator 125, generating a signed composite digital baseband signal. A fourth position of the multiplexers might be used for the generation/modulation of an RDS or other additional sub-carrier signal.

Figure 5A:
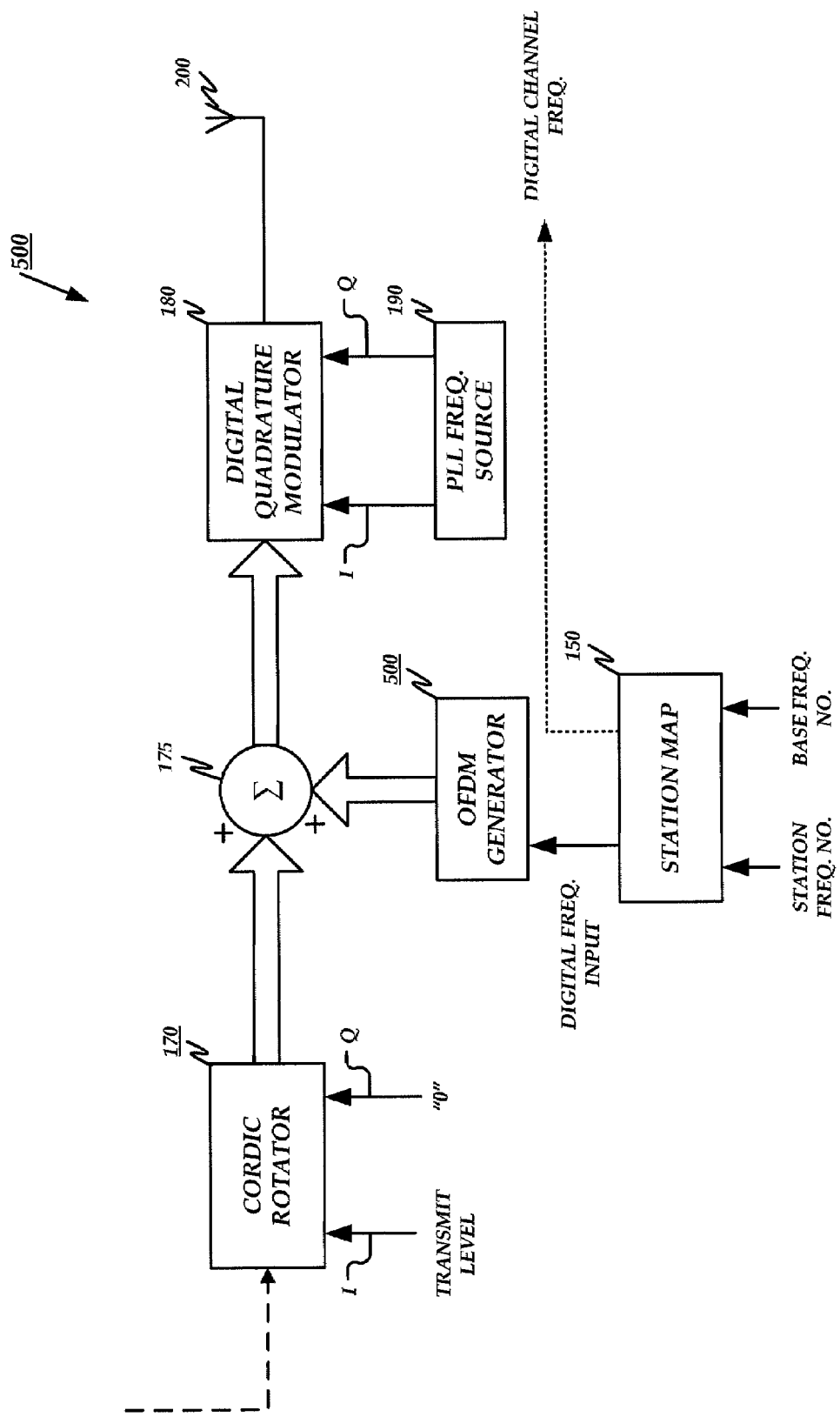
FIG. 5A is a block diagram of that illustrates how an FM transmitter can be adapted for adding an OFDM signal for digital broadcasting to the FM signal.

FIG. 5A shows how this device would have an on-channel orthogonal frequency division multiplexing (OFDM) signal for digital broadcasting added to the FM signal. In this variation of the invention, a complex adder 175 is shown between quadrature modulator 180 and existing cordic rotator 170. The unassigned input of adder 175 is now coupled to the output of an OFDM generator 500.

Figure 5B:
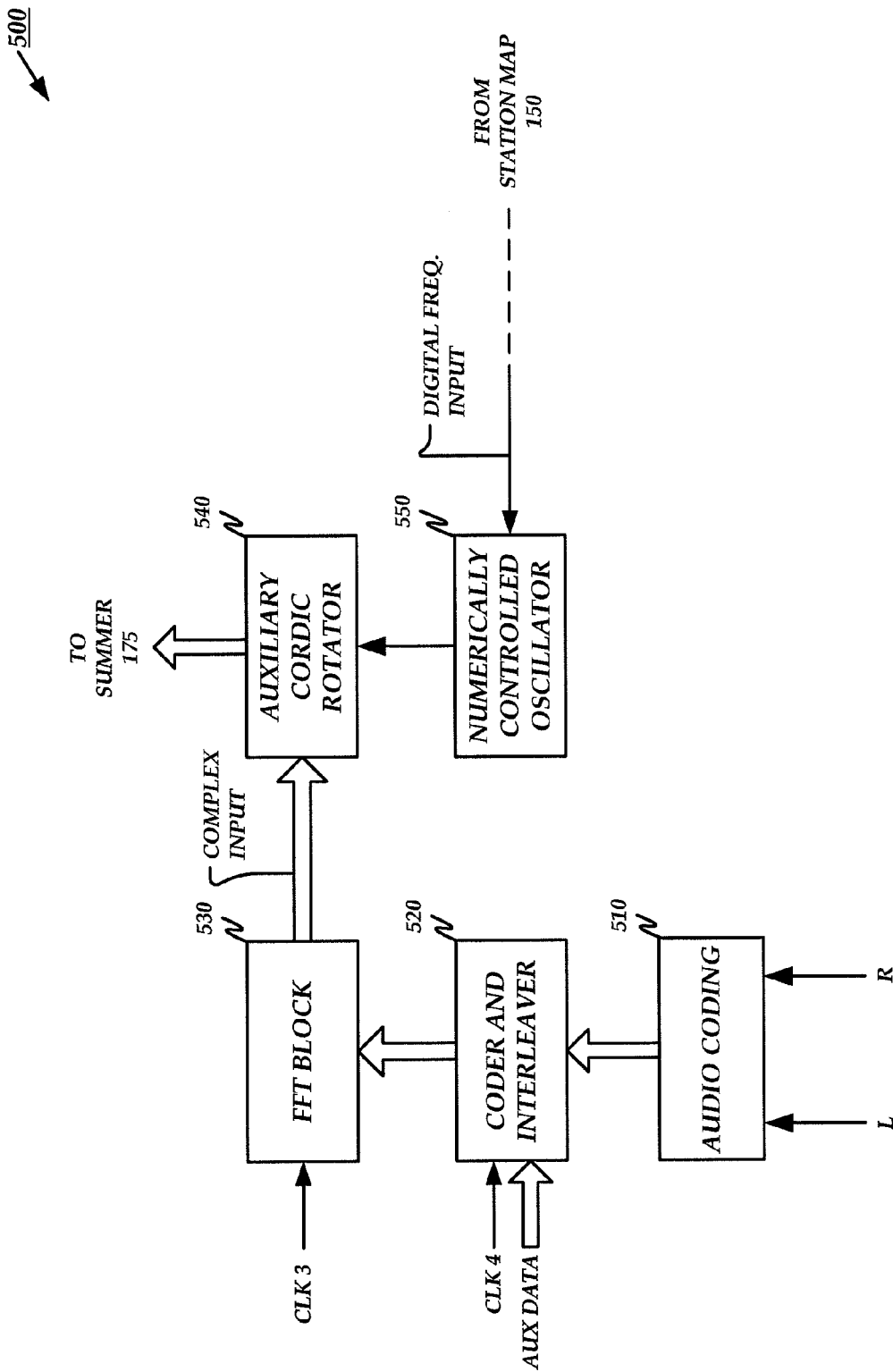
FIG. 5B is a further block diagram that illustrates an example structure for an OFDM generator, arranged in accordance with some embodiments of the present disclosure.

FIG. 5B shows the structure of the OFDM generator 500. The output of the audio baseband processing block 110 is coupled to an audio coding unit 510, which performs digital compression on the Left and Right channel audio. The data from block 510, along with auxiliary data, is presented to the coding and interleaving block 520, which converts its input to subcarrier phases and amplitudes. The output of block 520 is coupled to an FFT block 530, which creates the multiple subcarriers as a time sequence of complex samples. The output of the FFT block 530 is coupled to the I and Q inputs of supplemental cordic rotator 540. The angle input of supplemental cordic rotator 540 is coupled to a numerically controlled oscillator 550, whose digital frequency input is generated by the station map generator 150, causing the OFDM signal to be centered on channel with respect to the conventional FM modulation.

The cordic rotators described herein are merely illustrative implementations of a complex rotator that is contemplated in the present disclosure. Alternative complex rotators can be used such as complex multipliers arranged in collaboration with sine/cosine tables to provide the same overall function.

This presently disclosed invention has a number of advantages with respect to prior art DDS based FM transmitters. The DDS portion in a conventional transmitter must operate at typically 300 MHz or faster, with a data width of at least 28 bits. This is likely to consume appreciable power and create significant levels of on chip noise. In some embodiments arranged according to the present disclosure, the DDS has a lower operating frequency (e.g., around 50 MHz), which can use about ⅛th the power and generates ⅛th the noise, assuming all other factors are equal. In some additional embodiments, the DDS of the present disclosure needn't be as many bits wide in design providing further savings.

Another advantage of some embodiments of the presently disclosure is that the alias terms are more manageable, since the alias terms diminish as the ratio of the offset frequency to the IF alias, rather than as the ratio of the station frequency to the to the RF alias.

The presently disclosed circuit and system arrangements can also be employed to advantageously allow for integration of OFDM signaling into a single chip FM transmitter, while conventional RF DDS designs do not permit such integration.

In some example embodiments, the presently disclosed circuits, systems and methods do not need high speed angle processing blocks, such as sine and cosine ROMS and multipliers, to generate its output.

Although the preceding description describes various embodiments of the system, the invention is not limited to such embodiments, but rather covers all modifications, alternatives, and equivalents that fall within the spirit and scope of the invention.

What is claimed:

1. An integrated circuit for digitally synthesizing a signal for FM transmission with a complex variable frequency digital IF signal, the integrated circuit comprising:
    a baseband audio processing block that is arranged to generate a first digital signal and a second digital signal in response to a left signal and a right signal, wherein the first digital signal is associated with a sum of the left signal and the right signal, and wherein the second digital signal is associated with a difference between the left signal and the right signal;
    a composite baseband generator block that is arranged to generate a signed digital composite baseband signal in response to the first digital signal, the second digital signal, and a pilot level;
    an up-sampler that is arranged to generate a digital sign extended frequency in response to the signed digital composite baseband signal such that the digital sign extended frequency has reduced alias components relative to the FM transmission;
    a station map that is arranged to generate a digital channel offset in response to a digitally represented base frequency number and a digitally represented station frequency number;
    a summer that is arranged to generate a digital level-translated composite signal as a sum of the digital channel offset and the digital signed digital composite baseband signal;
    a numerically controlled oscillator that is arranged to generate a phase signal in response to the digital level-translated composite signal; and
    a complex rotator that is arranged to generate the complex variable frequency digital IF signal in response to the phase signal and a transmit level that is specified by an in-phase input.

2. The integrated circuit of claim 1, wherein the left signal and the right signal are either analog input signals or digital input signals.

3. The integrated circuit of claim 1, the baseband audio processing block comprising a left processing block a right processing block for processing the right signal, wherein the left processing block is substantially matched to the right processing block, wherein each of the left and right processing blocks comprising an analog-to-digital converter that is arranged to convert the an analog signal to a digital signal, a low pass filter that is arranged to filter the digital signal to provide a filtered digital signal, a pre-emphasis block that is arranged to generate a emphasized digital signal in response to the filtered digital signal, and an up-sampler that is arranged to up-sample and interpolate the emphasized digital signal to provide a processed digital signal.

4. The integrated circuit of claim 3, the baseband audio processing block further comprising a first summer that is arranged to add the processed digital signals from each of the left processing block and the right processing block to generate the first digital signal, and a second summer that is arranged to subtract the processed digital signal from the right processing block from the processed digital signal of the left processing block to generate the second digital signal.

5. The integrated circuit of claim 3, the baseband audio processing block further comprising a first summer that is arranged to add the left signal to the right signal to generate an first analog input signal for the left processing block, and a second summer that is arranged to subtract the right signal from the left signal to generate a second analog input signal to the right processing block, wherein the processed digital signal from the left processing block corresponds to the first digital signal and the processed digital signal from the right processing block corresponds to the second digital signal.

6. The integrated circuit of claim 1, the composite baseband generator comprising:
    a digital oscillator arranged to generate a pilot center frequency number and a sub-carrier frequency number;
    a cordic rotator that includes an in-phase (I) input, a quadrature-phase (Q) input, an angle input, and an output, wherein the quadrature-phase (Q) input of the cordic rotator is arranged to receive a first constant value;
    an accumulator that is coupled to the output of the cordic rotator, and arranged to generate the signed composite digital baseband signal as a sum if the output of the cordic rotator;
    a first multiplexer arranged to selectively couple one of the first digital signal, the second digital signal, and a pilot level number to the in-phase (I) input of the cordic rotator; and
    a second multiplexer arranged to selectively couple one of a second constant value, the sub-carrier frequency number, and the pilot center frequency number to the angle input of the cordic rotator, wherein the first multiplexer and the second multiplexer are arranged such that the first digital signal is coupled to the in-phase (I) input at the same time that the second constant value is coupled to the angle input, the second digital signal is coupled to the in-phase (I) input at the same time that the sub-carrier frequency number is coupled to the angle input, and the pilot level is coupled to the in-phase (I) input at the same time that the pilot center frequency number is coupled to the angle input.

7. The integrated circuit of claim 6, wherein the first multiplexer and the second multiplexer are further arranged such that an RDS baseband signal is coupled to the in-phase (I) input of the cordic rotator at the same time that an RDS frequency number is coupled to the angle input of the cordic rotator.

8. The integrated circuit of claim 6, wherein the first constant value is the same as the second constant value.

9. The integrated circuit of claim 1, wherein the complex rotator comprises either a cordic rotator or a complex multiplier arranged in cooperation with sine/cosine tables.

10. The integrated circuit of claim 1, further comprising a digital quadrature modulator that is arranged to generate the signal for FM transmission in response to the complex variable frequency digital IF signal.

11. The integrated circuit of claim 1, further comprising an orthogonal frequency division multiplexer (OFDM) generator that is arranged to generate an OFDM signal that comprises a plurality of digitally synthesized sub-carriers that are centered on a selected channel for the FM transmission, wherein the selected channel for the FM transmission is designated by a digital frequency input from the station map.

12. The integrated circuit of claim 11, further comprising a second summer that is arranged to combine the complex variable frequency digital IF signal with the OFDM signal.

13. The integrated circuit of claim 12, further comprising a digital quadrature modulator that is arranged to generate the signal for FM transmission in response to the sum of the complex variable frequency digital IF signal and the OFDM signal.

14. The integrated circuit of claim 11, the OFDM generator comprising:
 a second numerically controlled oscillator that is arranged to generator a digital oscillator signal in response to the digital frequency input from the station map;
 an audio coding block that is arranged to generate compressed audio from the left signal and the right signal;
 a coder and interleaver block that is arranged to generate a plurality of coded signals in response to the compressed audio from the audio coding block and auxiliary data;
 an FFT block that is arranged to generate a complex input signal in response to the plurality of coded signals; and
 an auxiliary cordic rotator that is arranged to generate the OFDM signal in response to the complex input signal and the digital oscillator signal.

15. A method for an integrated circuit to digitally synthesizing a signal for FM transmission with a complex variable frequency digital IF signal, the method comprising:
 generating a first digital signal and a second digital signal with a baseband processor in response to a left signal and a right signal, wherein the first digital signal is associated with a sum of the left signal and the right signal, and wherein the second digital signal is associated with a difference between the left signal and the right signal;
 generating a signed composite digital baseband signal with a composite baseband generator in response to the first digital signal, the second digital signal, and a pilot level;
 up-sampling the signed composite digital baseband signal to generate a sign extended digital frequency such that the sign extended digital frequency has reduced alias components relative to the FM transmission;
 generating a digital channel offset with a station map in response to a digitally represented base frequency number and a digitally represented station frequency number;
 adding the digital channel frequency and the digital sign extended frequency to generate a digital level-translated composite signal;
 generating a phase signal in response to the digital level-translated composite signal with a numerically controlled oscillator; and
 generating the complex variable frequency digital IF signal with a complex rotator in response to the phase signal and a transmit level that is specified by an in-phase input.

16. The method of claim 15, further comprising digitally modulating an in-phase (I) carrier signal and a quadrature phase (Q) carrier signal with a digital modulator in response to the complex variable frequency digital IF signal.

17. The method of claim 16, further comprising transmitting the digitally modulated signals.

18. The method of claim 15, further comprising generating an orthogonal frequency division multiplexer (OFDM) signal with an OFDM generator such that the OFDM signal comprises a plurality of digitally synthesized sub-carriers that are centered on a selected channel for the FM transmission, wherein the selected channel for the FM transmission is designated by a digital frequency input from the station map.

19. The method of claim 18, further comprising adding the complex variable frequency digital IF signal with the OFDM signal.

20. The method of claim 18, further comprising digitally modulating an in-phase (I) carrier signal and a quadrature phase (Q) carrier signal with a digital modulator in response to the sum of the complex variable frequency digital IF signal and the OFDM signal.

* * * * *